US012659370B2

(12) United States Patent
Hafeezulla et al.

(10) Patent No.: US 12,659,370 B2
(45) Date of Patent: Jun. 16, 2026

(54) ASSET DATA RETRIEVAL OPTMIZATION

(71) Applicant: Honeywell International Inc., Charlotte, NC (US)

(72) Inventors: Mohamad Hafeezulla, Bangalore (IN); Atul Bassi, Bangalore (IN); Tarun Gupta, Bangalore (IN); Anubhav Misra, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 22 days.

(21) Appl. No.: 18/906,191

(22) Filed: Oct. 4, 2024

(65) Prior Publication Data

US 2026/0100981 A1 Apr. 9, 2026

(51) Int. Cl.
*H04L 67/1014* (2022.01)
*G06F 21/62* (2013.01)

(52) U.S. Cl.
CPC ...... *H04L 67/1014* (2013.01); *G06F 21/6218* (2013.01)

(58) Field of Classification Search
None
See application file for complete search history.

(56) References Cited

U.S. PATENT DOCUMENTS

| | | | | |
|---|---|---|---|---|
| 11,755,629 | B1* | 9/2023 | Ghafourifar | G06F 16/313 |
| | | | | 707/739 |
| 2018/0096252 | A1* | 4/2018 | Fagundes | G06N 20/00 |
| 2018/0209678 | A1* | 7/2018 | Ferrari | F24F 11/65 |
| 2019/0223720 | A1* | 7/2019 | Lisogurski | A61B 5/746 |
| 2019/0324430 | A1* | 10/2019 | Herzog | G06Q 50/40 |
| 2023/0146463 | A1* | 5/2023 | Agarwal | H04L 67/535 |
| | | | | 726/23 |
| 2025/0004451 | A1* | 1/2025 | Yu | G05B 19/4185 |
| 2025/0264378 | A1* | 8/2025 | Al-Hafith | G01M 99/005 |
| 2025/0307957 | A1* | 10/2025 | Dumstorff | G06F 16/9535 |
| 2025/0391523 | A1* | 12/2025 | Aravamudan | G16H 10/60 |

* cited by examiner

*Primary Examiner* — Chris Parry
*Assistant Examiner* — Abderrahmen Chouat
(74) *Attorney, Agent, or Firm* — Alston & Bird LLP

(57) ABSTRACT

Techniques for optimizing retrieval of operational parameters for a plurality of asset sets within a facility are described. In an example, a data retrieval request for retrieving operational parameters for a first asset set and a second asset set within a facility is received. A first server and a second server configured to respectively monitor and control operations of the first asset set and the second asset set are then identified. A first data retrieval request and a second data retrieval request are then generated for retrieving operational parameters for the first asset set and the second asset set. The first data retrieval request and the second data retrieval request are then transmitted to the first server and the second server, respectively. The operational parameters for the first asset set and the second asset set are then received.

20 Claims, 11 Drawing Sheets

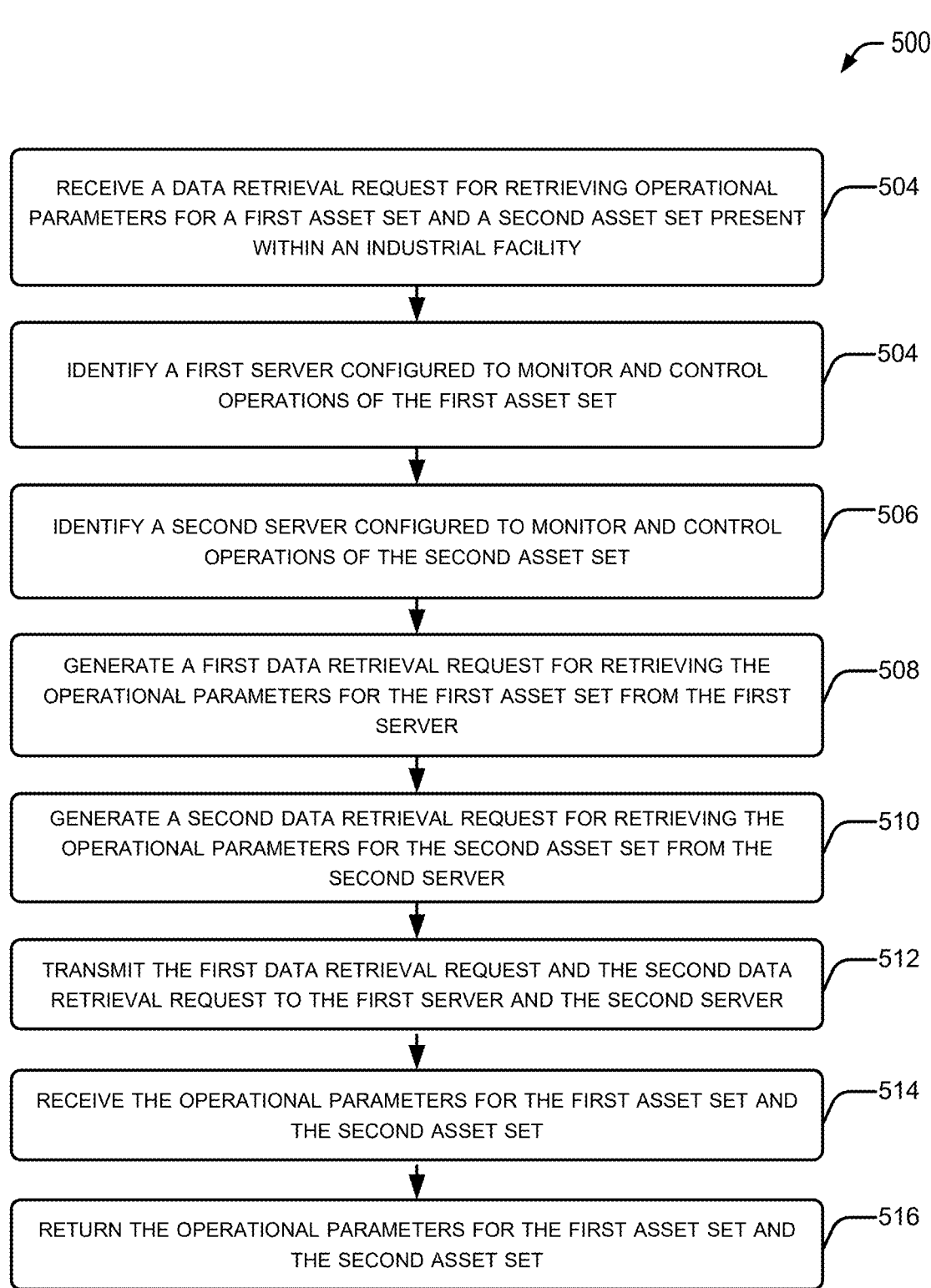

500

RECEIVE A DATA RETRIEVAL REQUEST FOR RETRIEVING OPERATIONAL PARAMETERS FOR A FIRST ASSET SET AND A SECOND ASSET SET PRESENT WITHIN AN INDUSTRIAL FACILITY ⸺504

IDENTIFY A FIRST SERVER CONFIGURED TO MONITOR AND CONTROL OPERATIONS OF THE FIRST ASSET SET ⸺504

IDENTIFY A SECOND SERVER CONFIGURED TO MONITOR AND CONTROL OPERATIONS OF THE SECOND ASSET SET ⸺506

GENERATE A FIRST DATA RETRIEVAL REQUEST FOR RETRIEVING THE OPERATIONAL PARAMETERS FOR THE FIRST ASSET SET FROM THE FIRST SERVER ⸺508

GENERATE A SECOND DATA RETRIEVAL REQUEST FOR RETRIEVING THE OPERATIONAL PARAMETERS FOR THE SECOND ASSET SET FROM THE SECOND SERVER ⸺510

TRANSMIT THE FIRST DATA RETRIEVAL REQUEST AND THE SECOND DATA RETRIEVAL REQUEST TO THE FIRST SERVER AND THE SECOND SERVER ⸺512

RECEIVE THE OPERATIONAL PARAMETERS FOR THE FIRST ASSET SET AND THE SECOND ASSET SET ⸺514

RETURN THE OPERATIONAL PARAMETERS FOR THE FIRST ASSET SET AND THE SECOND ASSET SET ⸺516

FIG. 5

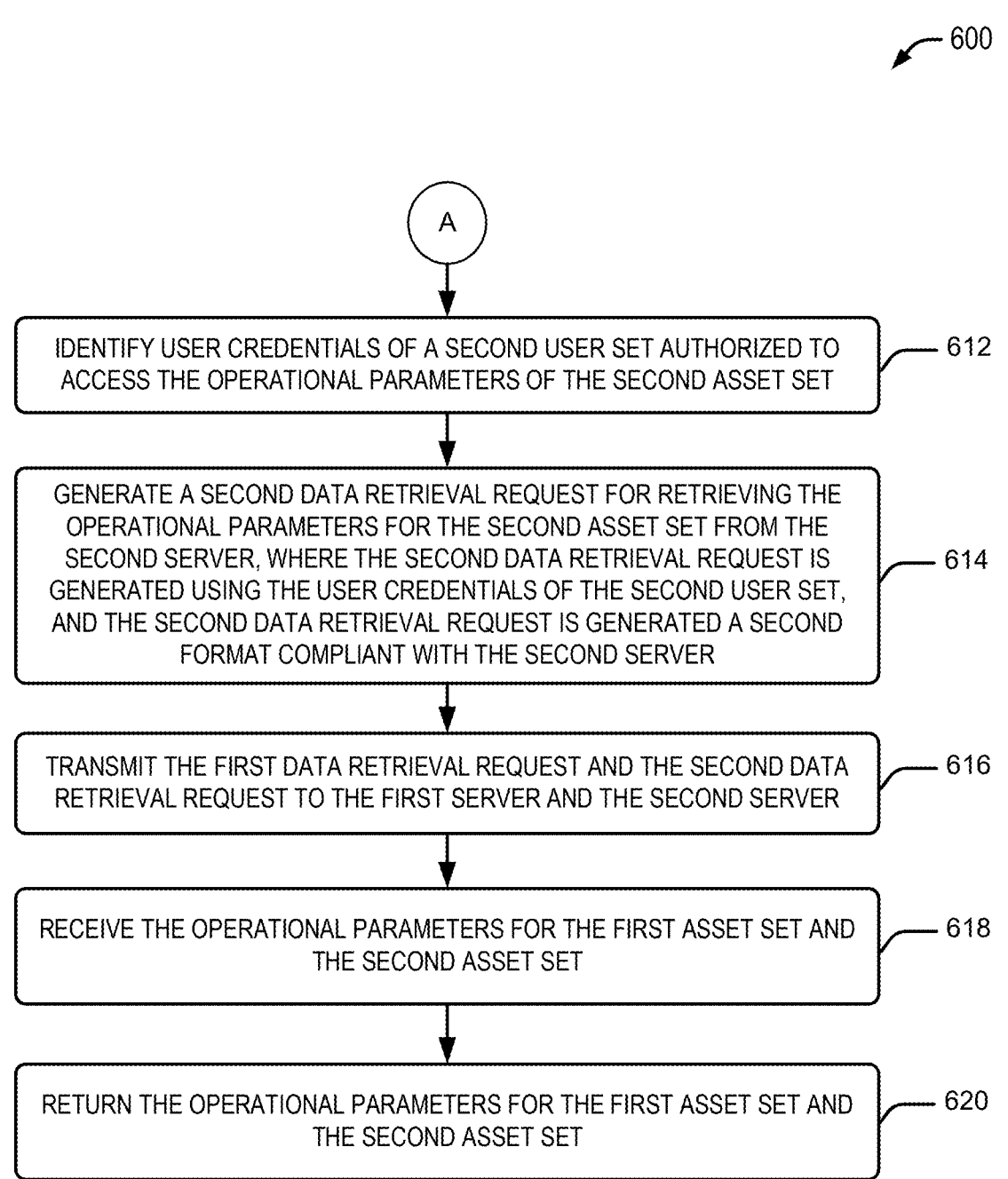

600

A

IDENTIFY USER CREDENTIALS OF A SECOND USER SET AUTHORIZED TO ACCESS THE OPERATIONAL PARAMETERS OF THE SECOND ASSET SET — 612

GENERATE A SECOND DATA RETRIEVAL REQUEST FOR RETRIEVING THE OPERATIONAL PARAMETERS FOR THE SECOND ASSET SET FROM THE SECOND SERVER, WHERE THE SECOND DATA RETRIEVAL REQUEST IS GENERATED USING THE USER CREDENTIALS OF THE SECOND USER SET, AND THE SECOND DATA RETRIEVAL REQUEST IS GENERATED A SECOND FORMAT COMPLIANT WITH THE SECOND SERVER — 614

TRANSMIT THE FIRST DATA RETRIEVAL REQUEST AND THE SECOND DATA RETRIEVAL REQUEST TO THE FIRST SERVER AND THE SECOND SERVER — 616

RECEIVE THE OPERATIONAL PARAMETERS FOR THE FIRST ASSET SET AND THE SECOND ASSET SET — 618

RETURN THE OPERATIONAL PARAMETERS FOR THE FIRST ASSET SET AND THE SECOND ASSET SET — 620

FIG. 6B

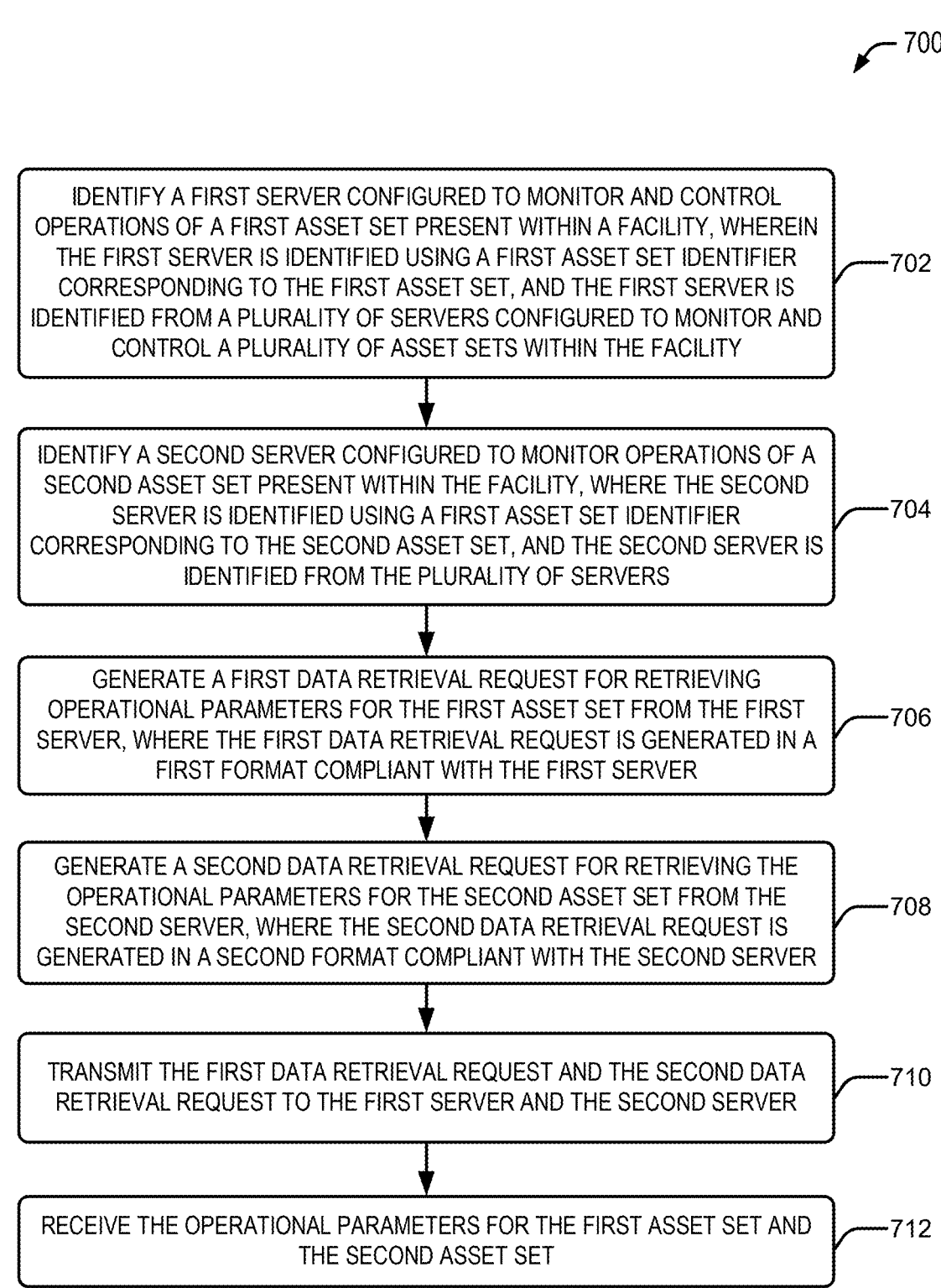

700

IDENTIFY A FIRST SERVER CONFIGURED TO MONITOR AND CONTROL OPERATIONS OF A FIRST ASSET SET PRESENT WITHIN A FACILITY, WHEREIN THE FIRST SERVER IS IDENTIFIED USING A FIRST ASSET SET IDENTIFIER CORRESPONDING TO THE FIRST ASSET SET, AND THE FIRST SERVER IS IDENTIFIED FROM A PLURALITY OF SERVERS CONFIGURED TO MONITOR AND CONTROL A PLURALITY OF ASSET SETS WITHIN THE FACILITY ——702

IDENTIFY A SECOND SERVER CONFIGURED TO MONITOR OPERATIONS OF A SECOND ASSET SET PRESENT WITHIN THE FACILITY, WHERE THE SECOND SERVER IS IDENTIFIED USING A FIRST ASSET SET IDENTIFIER CORRESPONDING TO THE SECOND ASSET SET, AND THE SECOND SERVER IS IDENTIFIED FROM THE PLURALITY OF SERVERS ——704

GENERATE A FIRST DATA RETRIEVAL REQUEST FOR RETRIEVING OPERATIONAL PARAMETERS FOR THE FIRST ASSET SET FROM THE FIRST SERVER, WHERE THE FIRST DATA RETRIEVAL REQUEST IS GENERATED IN A FIRST FORMAT COMPLIANT WITH THE FIRST SERVER ——706

GENERATE A SECOND DATA RETRIEVAL REQUEST FOR RETRIEVING THE OPERATIONAL PARAMETERS FOR THE SECOND ASSET SET FROM THE SECOND SERVER, WHERE THE SECOND DATA RETRIEVAL REQUEST IS GENERATED IN A SECOND FORMAT COMPLIANT WITH THE SECOND SERVER ——708

TRANSMIT THE FIRST DATA RETRIEVAL REQUEST AND THE SECOND DATA RETRIEVAL REQUEST TO THE FIRST SERVER AND THE SECOND SERVER ——710

RECEIVE THE OPERATIONAL PARAMETERS FOR THE FIRST ASSET SET AND THE SECOND ASSET SET ——712

IDENTIFY AN API MASHUP CORRESPONDING TO THE FIRST SERVER AND THE SECOND SERVER, WHEREIN THE API MASHUP IS IDENTIFIED FROM A PLURALITY OF API MASHUPS, AND EACH OF THE PLURALITY OF API MASHUPS CORRESPOND TO AT LEAST TWO SERVERS FROM THE PLURALITY OF SERVERS — 804

UTILIZE THE API MASHUP TO TRANSMIT THE FIRST DATA RETRIEVAL REQUEST AND THE SECOND DATA RETRIEVAL REQUEST — 804

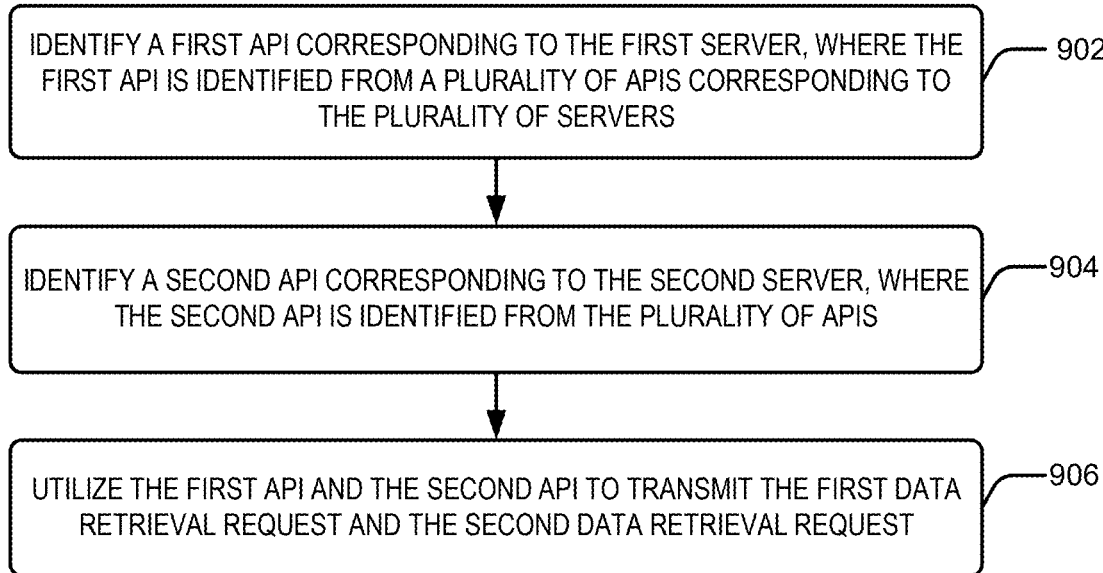

IDENTIFY A FIRST API CORRESPONDING TO THE FIRST SERVER, WHERE THE FIRST API IS IDENTIFIED FROM A PLURALITY OF APIS CORRESPONDING TO THE PLURALITY OF SERVERS — 902

IDENTIFY A SECOND API CORRESPONDING TO THE SECOND SERVER, WHERE THE SECOND API IS IDENTIFIED FROM THE PLURALITY OF APIS — 904

UTILIZE THE FIRST API AND THE SECOND API TO TRANSMIT THE FIRST DATA RETRIEVAL REQUEST AND THE SECOND DATA RETRIEVAL REQUEST — 906

FIG. 9

ASSET DATA RETRIEVAL OPTMIZATION

BACKGROUND

Industrial facilities encompass a wide variety of equipment, machinery, and systems essential for operations. Such equipment, machinery, and systems are usually grouped into different asset sets to perform different operations. Such asset sets are often monitored and controlled by multiple servers distributed throughout the facility. As industrial operations grow in scale and complexity, the number of asset sets and corresponding servers for monitoring and controlling also increases, resulting in an intricate network of data sources and control points.

BRIEF DESCRIPTION OF DRAWINGS

FIG. 5 illustrates a method for optimizing retrieval of operational parameters for a plurality of asset sets within a facility, in accordance with another example of the present subject matter, FIGS. 6A and 6B illustrate a method for optimizing retrieval of the operational parameters for the plurality of asset sets, in accordance with another example of the present subject matter, FIG. 7 illustrates a method for optimizing retrieval of the operational parameters for the plurality of asset sets, in accordance with yet another example of the present subject matter, FIG. 9 illustrates a method for transmitting data retrieval requests to the plurality of servers corresponding to the plurality of asset sets, in accordance with another example of the present subject matter.

Figure 1:
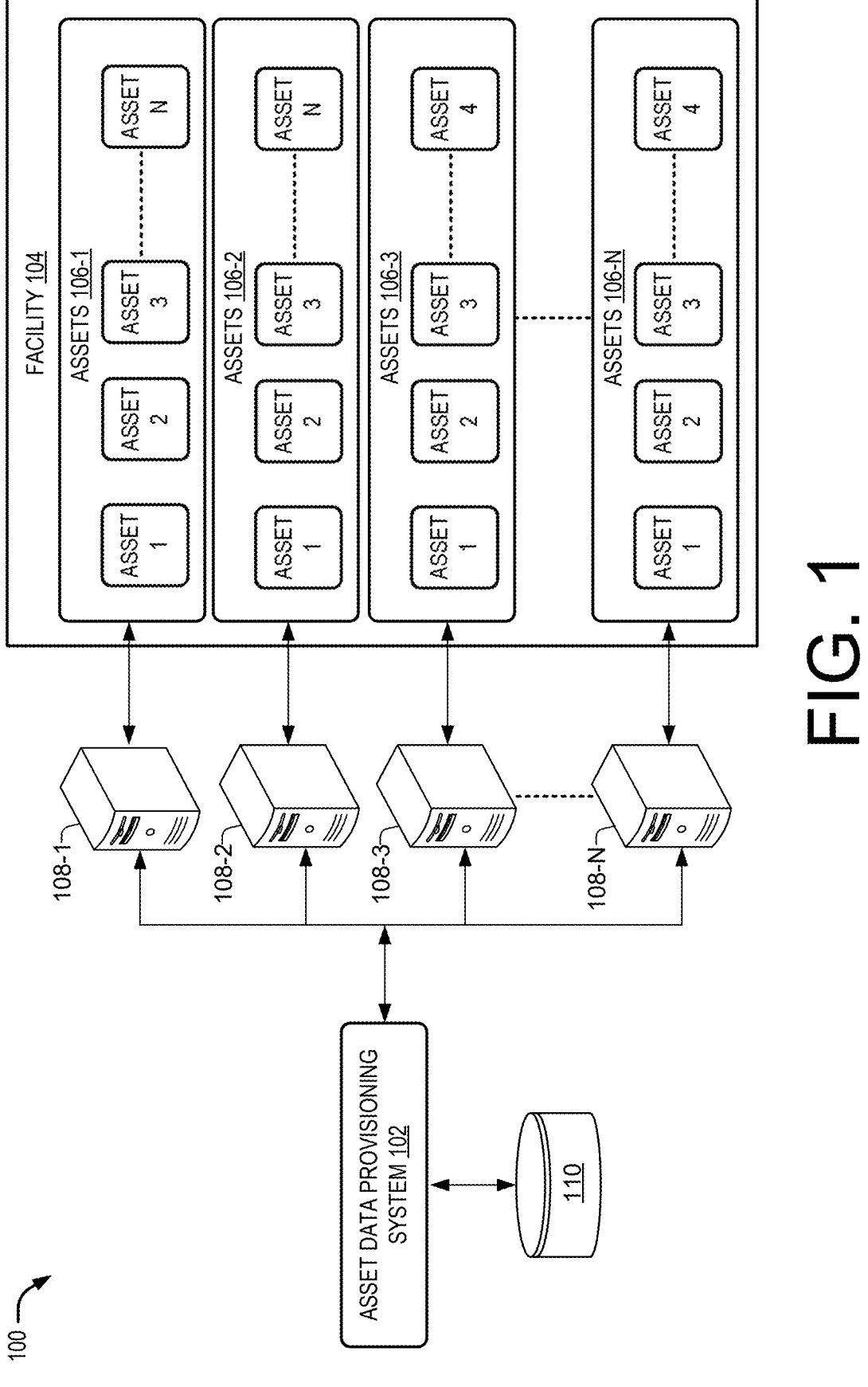
FIG. 1 illustrates an environment for implementing an Asset Data Provisioning System (ADPS), in accordance with an example of the present subject matter.

Throughout the drawings, identical reference numbers designate similar, but not necessarily identical, elements. The drawings provide examples and/or implementations consistent with the description; however, the description is not limited to the examples and/or implementations provided in the drawings.

DETAILED DESCRIPTION

To facilitate monitoring and control operation of an asset set, a server corresponding to the asset set retrieves the operational parameters for the asset set at regular intervals and provide the operational parameters to an operator responsible for monitoring the operations of the asset set via a Human-Machine Interface (HMI) client connected to the server. The operator analyses the operational parameters and initiates control actions for the asset set.

In several situations, operations of different asset sets encompassed within a facility are interdependent on each other. In such situations, to monitor and control the operation of the different asset sets, operational parameters for the different asset sets entail simultaneous analysis and in consideration of their interdependency to identify the potential effects that operation of a first asset set may be having on the operation of other asset sets. However, retrieving and aggregating operational parameters from different asset sets, particularly when the asset sets are monitored by different servers is difficult and time consuming. The difficulty is further aggravated in situations where the number of asset sets present within the facility is high and their interdependency is complex.

In addition, industrial facilities commonly implement stringent access control measures to maintain data security and operational integrity. Consequently, different users may possess varying levels of access rights to access operational parameters from different asset sets. Managing the access rights across multiple servers and asset sets introduces additional complexity to the operational parameters' retrieval process.

Further, as industrial processes become more interconnected and data-driven, real-time access to the operational parameters across multiple asset sets becomes increasingly critical. Timely retrieval of accurate data is essential for informed decision-making, predictive maintenance, and optimizing overall facility performance. The complexity of modern industrial systems also introduces challenges related to data consistency and synchronization. Ensuring that the operational parameters retrieved from multiple servers are coherent and temporally aligned is crucial for accurate analysis and operational insights.

According to examples of the present subject matter, techniques for optimizing retrieval of operational parameters for a plurality of asset sets within a facility are described.

In an example, a data retrieval request for retrieving operational parameters for a first asset set and a second asset set present within a facility is received. The data retrieval request may include a first asset set identifier corresponding to the first asset set and a second asset set identifier corresponding to the second asset set. In response to the data retrieval request, a first server configured to monitor and control operations of the first asset set and a second server configured to monitor and control operations of the second asset set may be identified. The first server may be identified from amongst a plurality of servers configured to monitor and control a plurality of asset sets within the facility using the first asset set identifier. The second server may be identified from amongst the plurality of servers using the second asset set identifier. In an example, to identify the first server and the second server, a server database including a server identifier for each of the plurality of servers and asset set identifier of an asset set being monitored by each of the plurality of servers may be queried. Upon identification of the first server and the second server, a first data retrieval request and a second data retrieval request may be generated. The first data retrieval request may be generated for retrieving the operational parameters for the first asset set from the first server. Further, the first data retrieval request may be generated in a first format compliant with the first server. The second data retrieval request may be generated for retrieving the operational parameters for the second asset set from the second server. Further, the second data retrieval request may be generated in a second format compliant with the second server.

The first data retrieval request and the second data retrieval request may then be transmitted to the first server and the second server, respectively. The operational parameters for the first asset set and the second asset set may then be received. Subsequently, the operational parameters for the first asset set and the second asset set may be returned.

Using the server database containing server identifiers, asset set identifiers, and related information for identifying the servers configured to monitor and control the operation of different asset sets allows for rapid and accurate identification of the correct server for each asset set. As a result, the difficulties involved in navigating complex facilities with numerous servers and asset sets for getting a holistic view of operation of such asset sets is reduced.

In an example, in addition to the server identifier for each of the plurality of servers and asset set identifier of the asset set being monitored by each of the plurality of servers, the server database may also include user credentials of a plurality of users authorized to access the operational parameters of the asset set. Upon receiving the data retrieval request, the server database may be queried to identify the user credentials of the plurality of users authorized to access the operational parameters of the asset set. Thereafter, individual data retrieval requests for each of the first server and the second server may be generated using the identified user credentials.

Maintaining the user credentials for the plurality of users authorized to access the operational parameters of the various asset sets in the database structure and identifying such user credentials utilizing the server database upon reception of the data retrieval request provides a robust and efficient method for managing user access across multiple servers and asset sets. As a result, complexity involved in managing the access rights corresponding to the operational parameters' retrieval process is reduced.

Further, in addition to the server identifier for each of the plurality of servers, the asset set identifier of the asset set being monitored by each of the plurality of servers, and the user credentials of users authorized to access the operational parameters of the asset set, the server database may also include an API mashup corresponding to at least two servers from the plurality of servers. Once the individual data retrieval requests corresponding to the first server and the second servers are generated, the API mashup may be utilized for transmitting such data retrieval requests to the first server and the second server. Processing multiple data retrieval requests, potentially by using the API mashups, enables retrieval of data from the plurality of asset sets simultaneously, thereby ensuring that the operational parameters received from the different asset sets are temporally aligned. As a result, challenges related to consistency and synchronization of operational parameters corresponding to the different asset sets are addressed.

The above techniques are further described with reference to FIGS. 1 to 10. It would be noted that the description and the figures merely illustrate the principles of the present subject matter along with examples described herein and would not be construed as a limitation to the present subject matter. It is thus understood that various arrangements may be devised that, although not explicitly described or shown herein, embody the principles of the present subject matter. Moreover, all statements herein reciting principles, aspects, and implementations of the present subject matter, as well as specific examples thereof, are intended to encompass equivalents thereof.

FIG. 1 illustrates an environment for implementing an Asset Data Provisioning System (ADPS) 102, in accordance with an example of the present subject matter.

The environment 100 may include a facility 104, where the facility 104 may have a plurality of asset sets 106-1, 106-2, 106-3, . . . , 106-n. For the ease of reference, the plurality of asset sets 106-1, 106-2, 106-3, . . . , 106-n has been referred to as the plurality of asset sets 106, hereinafter. Examples of the facility 104 may include, but are not limited to, automobile assembly facilities, electronics manufacturing facilities, pharmaceutical production facilities, food processing plants, power plants, oil refineries, natural gas processing plants, steel mills, smelting plants, cement plants, water treatment facilities, wastewater treatment plants, warehouse and distribution centres, and port and shipping facilities. Further, examples of the asset sets 106 at the facility 104 may vary based on a type of facility 104 and an industrial process to be carried out at the facility. For instance, in an automobile assembly facility, asset sets may include robotic welding stations, paint booths, conveyor systems, and quality control inspection stations. In a pharmaceutical production facility, asset sets may comprise bioreactors, filtration systems, packaging lines, and sterilization equipment. For a power plant, asset sets may include turbines, generators, boilers, and emissions control systems. In an oil refinery, asset sets may consist of distillation columns, heat exchangers, pumps, and storage tanks. Each of these asset sets may have specific operational parameters that may have to be monitored and controlled to ensure efficient and safe operation of the facility 104.

The environment 100 may further include a plurality of servers 108-1, 108-2, 108-3, . . . , 108-n, where each of the plurality of servers may monitor and control operations of the plurality of asset sets 106. For the ease of reference, the plurality of servers 108-1, 108-2, 108-3, . . . , 108-n have been referred to as the plurality of servers 108, hereinafter. Examples of the plurality of servers may include, but are not limited to, Programmable Logic Control (PLC) and Remote Terminal Unit (RTU).

Further, the environment 100 may include a server database 110 communicatively coupled to the ADPS 102. In an example, the server database 110 may include at least one of server identifier for each of the plurality of servers, asset set identifier of an asset set being monitored by each of the plurality of servers, a plurality of users authorized to access the operational parameters of the asset set, and user credentials of the plurality of users authorized to access the operational parameters of the asset set.

In operation, the ADPS 102 may receive a data retrieval request for retrieving operational parameters for a first asset set, such as the asset set 106-1, and a second asset set, such as the asset set 106-2. In an example, the data retrieval request may include a first asset set identifier corresponding to the first asset set 106-1 and a second asset set identifier corresponding to the second asset set 106-2. In an example, the data retrieval request may be received from a requesting user, such as a facility manager for the facility 104.

Figure 2:
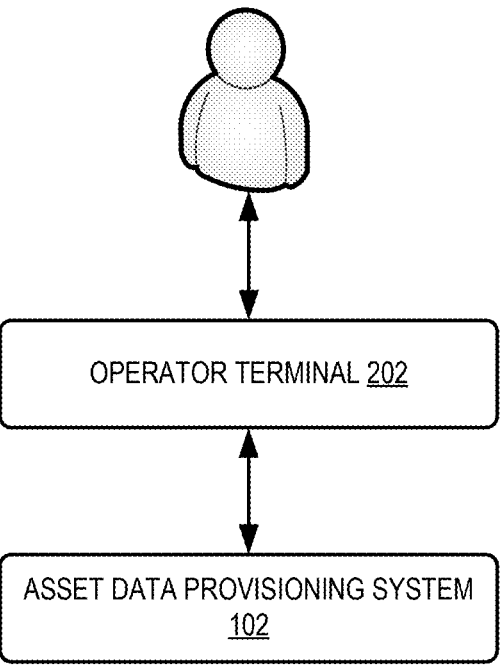
FIG. 2 illustrates the environment for implementing ADPS, in accordance with an example of the present subject matter.

As illustrated in FIG. 2, the requesting user 202 may provide the data retrieval request to the ADPS 102 via an operator terminal 204, such as a Human-Machine Interface (HMI). Upon receiving the data retrieval request, the operator terminal 204 may ask the requesting user 202 to provide user credentials. In an example, upon receiving the user credentials, the operating terminal 204 may authenticate the requesting user 202. If the requesting user 202 is success-fully authenticated, the operating terminal 204 may forward the data retrieval request to the ADPS 102. In another example, upon receiving the user credentials, the operator terminal 204 may include the user credentials in the data retrieval request and forward the data retrieval request to the ADPS 102.

In an example, upon receiving the data retrieval request, the interaction engine 302 may authenticate the requesting user 202 using the user credentials of the requesting user 202. Once the requesting user 202 is authenticated, the ADPS 102 may then identify a first server 108-1 configured to monitor and control operations of the first asset set 106-1. The ADPS 102 may identify the first server 108-1 using a first asset set identifier corresponding to the first asset set 106-1. In an example, the ADPS 102 may identify the first server 108-1 by querying the server database 110 using the first asset identifier.

Thereafter, the ADPS 102 may identify a second server 108-2 configured to monitor operations of the second asset 106-2. The ADPS 102 may identify the second server 108-2 using a second asset set identifier corresponding to the second asset set 106-2. In an example, the ADPS 102 may identify the second server 108-2 by querying the server database 110 using the second asset identifier.

It would be noted that while it has been described that the ADPS 102 identifies the first server 108-1 and the second server 108-2 upon receiving the data retrieval request, the ADPS 102 can also identify the first server 108-1 and the second server 108-2 automatically and without any user input. For instance, the ADPS 102 may identify the first server 108-1 and the second server 108-2 based on a probability of receiving the data retrieval request for the operational parameters of the first asset set 106-1 and the second asset set 106-2. In an example, the ADPS 102 may derive the probability based on a plurality of historical data retrieval requests received for simultaneously providing the operational parameters of at least two asset sets from the plurality of asset sets.

The ADPS 102 may then generate a first data retrieval request for retrieving operational parameters for the first asset set 106-1 from the first server 108-1. In an example, the ADPS 102 may generate the first data retrieval request in a first format that is compliant with the first server 108-1. Thereafter, the ADPS 102 may generate a second data retrieval request for retrieving operational parameters for the second asset set 106-2 from the second server 108-2. In an example, the ADPS 102 may generate the second data retrieval request in a second format that is compliant with the second server 108-2.

The ADPS 102 may then transmit the first data retrieval request and the second data retrieval request to the first server 108-1 and the second server 108-2. In response to the first data retrieval request and the second data retrieval request, the ADPS 102 may receive the operational parameters for the first asset set 106-1 and the second asset set 106-2. Subsequently, the ADPS 102 may return the operational parameters for the first asset set 106-1 and the second asset set 106-2.

Figure 3:
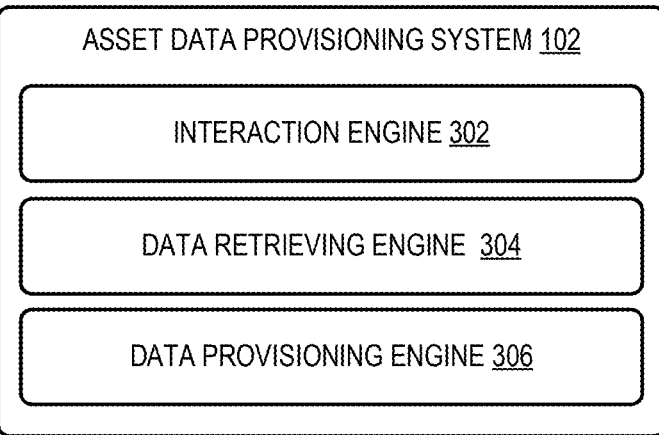
FIG. 3 illustrates schematics of the ADPS, in accordance with an example of the present subject matter.

FIG. 3 illustrates schematics of the ADPS 102, in accordance with an example of the present subject matter. In an example, the ADPS 102 may include an interaction engine 302. The interaction engine 302 may receive the data retrieval request for retrieving operational parameters for the first asset set 106-1 and the second asset 106-2. As already described, the data retrieval request may include the first asset set identifier corresponding to the first asset set and the second asset set identifier corresponding to the second asset set.

The ADPS 102 may further include a data retrieving engine 304 coupled to the interaction engine 302. Upon receiving the data retrieval request, the data retrieving engine 304 may identify the first server 108-1 using the first asset set identifier. In an example, the data retrieving engine 304 may identify the first server 108-1 by querying the server database 110 using the first asset identifier. The data retrieving engine 304 may then identify user credentials of a first user set authorized to access the operational parameters of the first asset set 106-1. In an example, the data retrieving engine 304 may identify the user credentials of the first user set from the server database 110.

The data retrieving engine 304 may then utilize the user credentials of the first user set to generate a first data retrieval request for retrieving the operational parameters for the first asset set 106-1 from the first server 108-1. In an example, the data retrieving engine 304 may generate the first data retrieval request in a first format compliant with the first server 108-1.

The data retrieving engine 304 may then identify the second server 108-2 using the second asset set identifier. In an example, the data retrieving engine 304 may identify the second server 108-2 by querying the server database 110 using the second asset identifier. The data retrieving engine 304 may then identify user credentials of a second user set authorized to access the operational parameters of the second asset set 106-2. In an example, the data retrieving engine 304 may identify the user credentials of the second user set from the server database 110.

The data retrieving engine 304 may then utilize the user credentials of the second user set to generate a second data retrieval request for retrieving the operational parameters for the second asset set 106-2 from the second server 108-2. In an example, the data retrieving engine 304 may generate the second data retrieval request in a second format compliant with the second server 108-2.

The data retrieving engine 304 may then transmit the first data retrieval request and the second data retrieval request to the first server 108-1 and the second server 108-2, respectively. Subsequently, the data retrieving engine 304 may receive the operational parameters for the first asset set 106-1 and the second asset set 106-2.

The ADPS 102 may further include a data provisioning engine 306 coupled to the data retrieving engine 304. The data provisioning engine 306 may return the operational parameters for the first asset set 106-1 and the second asset set 106-2. The manner in which the retrieval of operational parameters for the plurality of asset sets 106 is optimized is described in further details in conjunction with the forthcoming figures.

Figure 4:
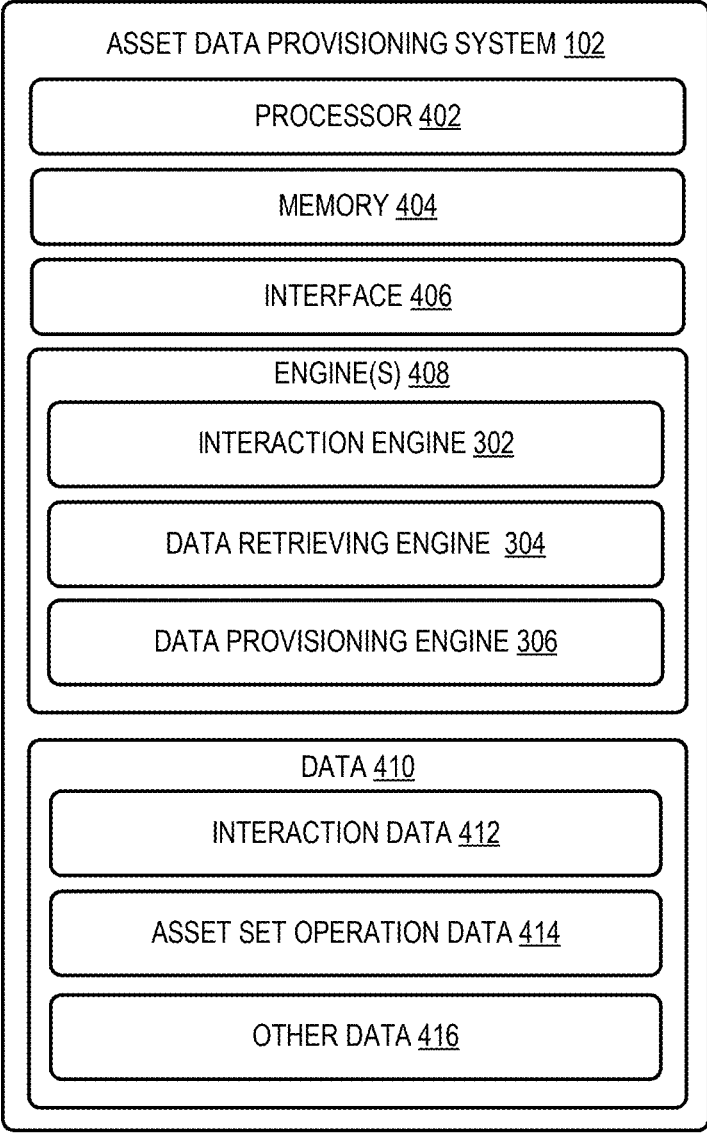
FIG. 4 illustrates the schematics of the ADPS, in accordance with another example of the present subject matter.

FIG. 4 illustrates the schematics of the ADPS 102, in accordance with another example of the present subject matter. As illustrated, the ADPS 102 may include a processor 402 and a memory 404 coupled to the processor 402. The functions of the various elements shown in the FIGs., including any functional blocks labelled as "processor(s)", may be provided through the use of dedicated hardware as well as hardware capable of executing instructions. When provided by a processor, the functions may be provided by a single dedicated processor, by a single shared processor, or by a plurality of individual processors, some of which may be shared. Moreover, explicit use of the term "processor" would not be construed to refer exclusively to hardware capable of executing instructions, and may implicitly include, without limitation, digital signal processor (DSP) hardware, network processor, application specific integrated circuit (ASIC), field programmable gate array (FPGA), read only memory (ROM) for storing instructions, random access memory (RAM), non-volatile storage. Other hardware, conventional and/or custom, may also be included.

The memory 404 may include any computer-readable medium including, for example, volatile memory (e.g., RAM), and/or non-volatile memory (e.g., EPROM, flash memory, etc.).

The ADPS 102 may further include an interface 406. The interface 406 may allow the connection or coupling of the ADPS 102 with one or more other devices, through a wired (e.g., Local Area Network, i.e., LAN) connection or through a wireless connection (e.g., Bluetooth®, WiFi). The interface 406 may also enable intercommunication between different logical as well as hardware components of the ADPS 102.

The ADPS 102 may further include engine(s) 408, where the engine(s) 408 may include the interaction engine 302, the data retrieving engine 304, and the data provisioning engine 306. In an example, the engine(s) 408 may be implemented as a combination of hardware and firmware or software. In examples described herein, such combinations of hardware and firmware may be implemented in several different ways. For example, the firmware for the engine may be processor executable instructions stored on a non-transitory machine-readable storage medium and the hardware for the engine may include a processing resource (for example, implemented as either a single processor or a combination of multiple processors), to execute such instructions.

In the present examples, the machine-readable storage medium may store instructions that, when executed by the processing resource, implement the functionalities of the engine. In such examples, the ADPS 102 may include the machine-readable storage medium storing the instructions and the processing resource to execute the instructions. In other examples of the present subject matter, the machine-readable storage medium may be located at a different location but accessible to the ADPS 102 and the processor 402.

The ADPS 102 may further include data 410, that serves, amongst other things, as a repository for storing data that may be fetched, processed, received, or generated by the engine(s) 408. The data 410 may include interaction data 412, asset set operation data 414, and other data 416. In an example, the data 410 may be stored in the memory 404.

In operation, the interaction engine 302 may receive the data retrieval request for retrieving operational parameters for the first asset set 106-1 and the second asset 106-2. The interaction engine 302 may receive the data retrieval request from the requesting user. Further, the data retrieval request may include the user credentials of the requesting user. In an example, upon receiving the data retrieval request, the interaction engine 302 may authenticate the requesting user using the user credentials of the requesting user.

The data retrieval request may further include the first asset set identifier corresponding to the first asset set and the second asset set identifier corresponding to the second asset set. Once the requesting user has been authenticated, the data retrieving engine 304 may identify the first server 108-1 using the first asset set identifier. In an example, the data retrieving engine 304 may identify the first server 108-1 by querying the server database 110 using the first asset identifier. The data retrieving engine 304 may then identify a first user set from the plurality of users authorized to access the operational parameters of the first asset set 106-1. Thereafter, the data retrieving engine 304 may identify the user credentials of the first user set. In an example, the data retrieving engine 304 may identify the first user set and user credentials for the first user set by querying the server database 110. The data retrieving engine 304 may then store the user credentials for the first user set in the interaction data 412.

The data retrieving engine 304 may then utilize the user credentials for the first user set to generate the first data retrieval request for retrieving the operational parameters for the first asset set 106-1 from the first server 108-1. In an example, the data retrieving engine 304 may generate the first data retrieval request in a first format compliant with the first server 108-1. In the example, the first format may correspond to a communication protocol supported by the first server 108-1 and may include, but is not limited to, Modbus, Modbus TCP/IP, Ethernet/IP, Profibus, Profinet, Open Platform Communication Unified Architecture (OPC UA), and Distributed Network Protocol version 3 (DNP3).

The data retrieving engine 304 may then identify the second server 108-2 using the second asset set identifier. In an example, the data retrieving engine 304 may identify the second server 108-2 by querying the server database 110 using the second asset identifier. The data retrieving engine 304 may then identify a second user set from the plurality of users authorized to access the operational parameters of the second asset set 106-2. Thereafter, the data retrieving engine 304 may identify the user credentials of the second user set. In an example, the data retrieving engine 304 may identify the second user set and user credentials for the second user set by querying the server database 110. The data retrieving engine 304 may then store the user credentials for the second user set in the interaction data 412.

The data retrieving engine 304 may then utilize the user credentials for the second user set to generate the second data retrieval request for retrieving the operational parameters for the second asset set 106-2 from the second server 108-2. In an example, the data retrieving engine 304 may generate the second data retrieval request in a second format compliant with the second server 108-2. In the example, the second format may correspond to a communication protocol supported by the second server 108-2 and may include, but is not limited to, Modbus, Modbus TCP/IP, Ethernet/IP, Profibus, Profinet, OPC UA, and DNP3.

The data retrieving engine 304 may then transmit the first data retrieval request and the second data retrieval request to the first server 108-1 and the second server 108-2. In an example, in addition to the server identifier for each of the plurality of servers, asset set identifier of an asset set being monitored by each of the plurality of servers, a plurality of users authorized to access the operational parameters of the asset set, and user credentials of the plurality of users authorized to access the operational parameters of the asset set, the server database 110 may also include an Application Programming Interface (API) corresponding to each of the plurality of servers. In the example, to transmit the first data retrieval request and the second data retrieval request, the data retrieving engine 304 may identify a first API corresponding to the first server 108-1 and a second API corresponding to the second server 108-2. The data retrieving engine 304 may identify the first API and the second API from a plurality of APIs stored in the server database 110. The data retrieving engine 304 may then utilize the first API and the second API to transmit the first data retrieval request and the second data retrieval request, respectively.

In another example, in addition to the server identifier for each of the plurality of servers, asset set identifier of an asset set being monitored by each of the plurality of servers, a plurality of users authorized to access the operational parameters of the asset set, and user credentials of the plurality of users authorized to access the operational parameters of the asset set, the server database 110 may also include at least one API mashup corresponding to at least two servers from the plurality of servers. In the example, to transmit the first data retrieval request and the second data retrieval request, the data retrieving engine 304 may identify an API mashup corresponding to the first server 108-1 and the second server 108-2. The data retrieving engine 304 may identify the API mashup from a plurality of API mashups stored in the server database 110. The data retrieving engine 304 may then utilize the API mashup to transmit the first data retrieval request and the second data retrieval request.

Subsequently, the data retrieving engine 304 may receive the operational parameters for the first asset set 106-1 and the second asset set 106-2. In an example, the data retrieving engine 304 may store the operational parameters for the first asset set 106-1 and the second asset set 106-2 in the asset set operation data 414. The data provisioning engine 306 may then return the operational parameters for the first asset set 106-1 and the second asset set 106-2 to the requesting user.

FIGS. 5, 6, and 7 illustrate methods 500, 600, and 700 for optimizing retrieval of operational parameters for the plurality of asset sets 106, in accordance with examples of the present subject matter. The order in which the methods are described is not intended to be construed as a limitation, and any number of the described method blocks may be combined in any order to implement the methods, or an alternative method. Further, the methods 500, 600, and 700 may be implemented by processing resource or computing device (s) through any suitable hardware, non-transitory machine-readable instructions, or combination thereof.

It may also be understood that methods 500, 600, and 700 may be performed by programmed computing devices, such as the ADPS 102. Furthermore, the methods 500, 600, and 700 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media. The methods 500, 600, and 700 are described below with reference to the ADPS 102, as described above; other suitable systems for the execution of these methods may also be utilized. Additionally, implementation of the method is not limited to such examples.

At block 502, a data retrieval request for retrieving operational parameters for a first asset set and a second asset set present within a facility is received. The data retrieval request includes a first asset set identifier corresponding to the first asset set and a second asset set identifier corresponding to the second asset set. The data retrieval request may be received by the interaction engine 302.

In an example, the data retrieval request may be received from a requesting user and may include user credentials of the requesting user. Upon receiving the data retrieval request, the requesting user is authenticated using the user credentials of the requesting user.

At block 504, a first server configured to monitor and control operations of the first asset set is identified using the first asset set identifier. The first server is identified from a plurality of servers configured to monitor and control a plurality of asset sets within the facility. The first server may be identified by the data retrieving engine 304.

In an example, the first server is identified from the plurality of servers by querying the server database, where the server database may include at least one of server identifier for each of the plurality of servers, asset set identifier of an asset set being monitored by each of the plurality of servers, a plurality of users authorized to access the operational parameters of the asset set, and user credentials of the plurality of users authorized to access the operational parameters of the asset set.

At block 506, a second server configured to monitor and control operations of the second asset set is identified using the second asset set identifier. The second server is identified from the plurality of servers by querying the server database. The second server may be identified by the data retrieving engine 304.

At block 508, a first data retrieval request for retrieving the operational parameters for the first asset set from the first server is generated. In an example, the first data retrieval request may be generated by the data retrieving engine 304.

In an example, the generation of the first data retrieval request includes identifying a first user set from the plurality of users authorized to access the operational parameters for the first asset set, identifying user credentials corresponding to the first user set, and generating the first data retrieval request using the user credentials corresponding to the first user set. In the example, the first data retrieval request is generated in a first format compliant with the first server. The first format may correspond to a communication protocol supported by the first server 108-1 and may include, but is not limited to, Modbus, Modbus TCP/IP, Ethernet/IP, Profibus, Profinet, OPC UA, and DNP3.

At block 510, a second data retrieval request for retrieving the operational parameters for the second asset set from the second server is generated. The second data retrieval request may be generated by the data retrieving engine 304.

In an example, the generation of the second data retrieval request includes identifying a second user set from the plurality of users authorized to access the operational parameters for the first asset set, identifying user credentials corresponding to the second user set, and generating the second data retrieval request using the user credentials corresponding to the second user set. In the example, the second data retrieval request is generated in a second format compliant with the second server. The second format may correspond to a communication protocol supported by the second server 108-2 and may include, but is not limited to, Modbus, Modbus TCP/IP, Ethernet/IP, Profibus, Profinet, OPC UA, and DNP3.

At block 512, the first data retrieval request and the second data retrieval request may be transmitted to the first server and the second server. The first data retrieval request and the second data retrieval request may be transmitted by the data retrieving engine 304. The manner in which the first data retrieval request and the second retrieval request are transmitted is described in conjunction with FIGS. 7 and 8.

At block 514, the operational parameters for the first asset set and the second asset set may be received. In an example, the operational parameters for the first asset set and the second asset set may be received by the data retrieving engine 304.

At block 516, the operational parameters for the first asset set and the second asset set may be returned to the data retrieval request. In an example, the operational parameters may be returned by the data provisioning engine 306.

Figure 6A:
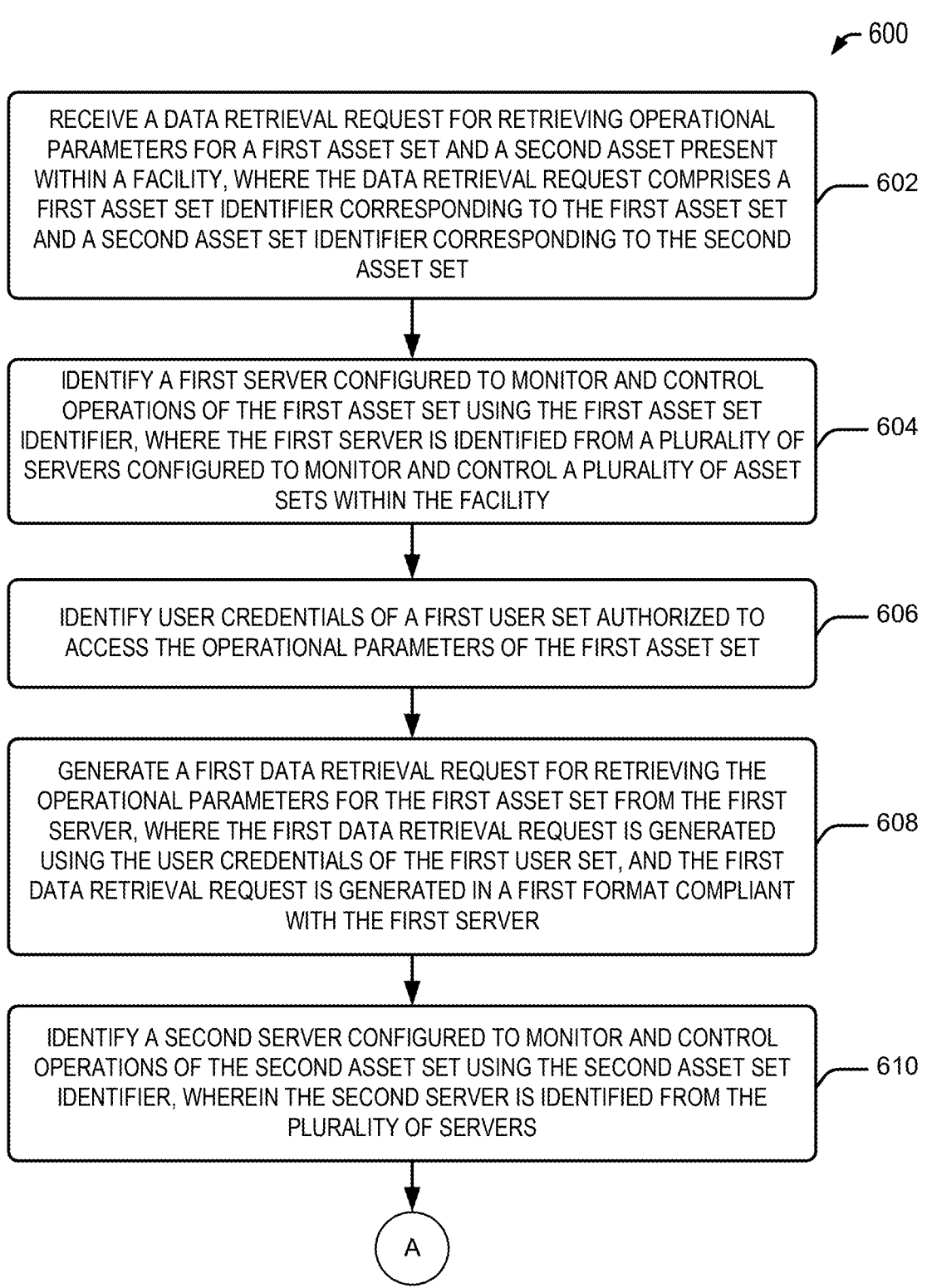

In FIGS. 6A and 6B, at block 602, a data retrieval request for retrieving operational parameters for the first asset set and the second asset may be received. The data retrieval request includes a first asset set identifier corresponding to the first asset set and a second asset set identifier corresponding to the second asset set. The data retrieval request may be received by the interaction engine 302.

In an example, the data retrieval request is received from a requesting user and includes user credentials of the requesting user. In the example, upon receiving the data retrieval request, the requesting user is authenticated using the user credentials of the requesting user.

At block 604, a first server configured to monitor and control operations of the first asset set may be identified using the first asset set identifier. The first server is identified from a plurality of servers configured to monitor and control a plurality of asset sets within the facility. The first server is identified from the plurality of servers by querying the server database. The first server may be identified by the data retrieving engine 304.

At block 606, user credentials of a first user set authorized to access the operational parameters of the first asset set are identified. In an example, the user credentials of the first asset set are identified by querying the server database. The user credentials of the first user set may be identified by the data retrieving engine 304.

At block 608, a first data retrieval request may be generated for retrieving the operational parameters for the first asset set from the first server. The first data retrieval request is generated using the user credentials of the first user set. Further, the first data retrieval request is generated in the first format compliant with the first server. The first data retrieval request may be generated by the data retrieving engine 304.

At block 610, a second server configured to monitor and control operations of the second asset set is identified using the second asset set identifier. The second server is identified from the plurality of servers by querying the server database. The second server may be identified by the data retrieving engine 304.

At block 612, user credentials of a second user set authorized to access the operational parameters of the second asset set are identified. In an example, the user credentials of the second asset set are identified by querying the server database. The user credentials of the second user set may be identified by the data retrieving engine 304.

At block 614, a second data retrieval request may be generated for retrieving the operational parameters for the second asset set from the second server. The second data retrieval request is generated using the user credentials of the second user set. Further, the second data retrieval request is generated in the second format compliant with the first server.

At block 616, the first data retrieval request and the second data retrieval request are transmitted to the first server and the second server. The second data retrieval request may be generated by the data retrieving engine 304.

At block 618, the operational parameters for the first asset set and the second asset set are received. The operational parameters for the first asset set and the second asset set may be received by the data retrieving engine 304.

At block 620, the operational parameters for the first asset set and the second asset set may be returned to the requesting user. The operational parameters may be returned by the data provisioning engine 306.

In FIG. 7, at block 702, the first server configured to monitor and control operations of the first asset set may be identified. The first server is identified using a first asset set identifier corresponding to the first asset set. Further, the first server is identified from a plurality of servers configured to monitor and control a plurality of asset sets within the facility. The first server may be identified by the data retrieving engine 304.

At block 704, the second server configured to monitor operations of a second asset set is identified. The second server is identified using a first asset set identifier corresponding to the second asset set. Further, the second server is identified from the plurality of servers. The second server may be identified by the data retrieving engine 304.

In an example, the first server and the second server may be identified based on a probability of receiving the data retrieval request for the operational parameters of the first asset set and the second asset set. In the example, the probability may be derived based on a plurality of historical data retrieval requests received for simultaneously providing the operational parameters of at least two asset sets from the plurality of asset sets.

At block 706, a first data retrieval request for retrieval of the operational parameters for the first asset set from the first server may be generated. The first data retrieval request may be generated in a first format compliant with the first server. The first data retrieval request may be generated by the data retrieving engine 304.

At block 708, a second data retrieval request for retrieval of the operational parameters for the second asset set from the second server may be generated. The second data retrieval request may be generated in a second format compliant with the second server. The second data retrieval request may be generated by the data retrieving engine 304.

At block 710, the first data retrieval request and the second data retrieval request are transmitted to the first server and the second server. The first data retrieval request and the second data retrieval request may be transmitted by the data retrieving engine 304.

At block 712, the operational parameters for the first asset set and the second asset set may be received. The operational parameters for the first asset set and the second asset set may be received by the data retrieving engine 304.

In an example, a data retrieval request for retrieving operational parameters for the first asset set and the second asset set present may then be received. The data retrieval request may be received from a requesting user and include user credentials of the requesting user. The requesting user may then be authenticated using the user credentials. Once authenticated, the operational parameters for the first asset set and the second asset set may be returned to the requesting user.

Figure 8:
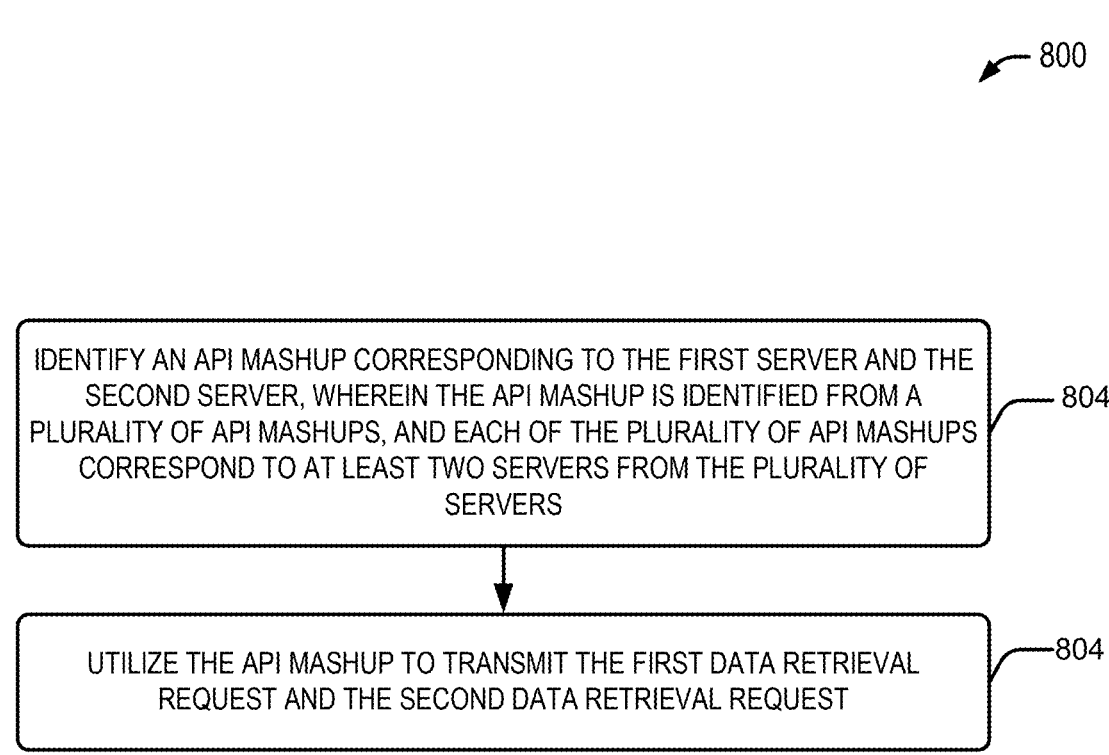
FIG. 8 illustrates a method for transmitting data retrieval requests to a plurality of servers corresponding to the plurality of asset sets, in accordance with an example of the present subject matter.

FIGS. 8 and 9 illustrate methods 800 and 900 for transmitting the first data retrieval request and the second data retrieval, in accordance with examples of the present subject matter. The order in which the methods are described is not intended to be construed as a limitation, and any number of the described method blocks may be combined in any order to implement the methods, or an alternative method. Further, the methods 800 and 900 may be implemented by processing resource or computing device(s) through any suitable hardware, non-transitory machine-readable instructions, or combination thereof.

It may also be understood that methods 800 and 900 may be performed by programmed computing devices, such as the ADPS 102. Furthermore, the methods 800 and 900 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media. The methods 800 and 900 are described below with reference to the ADPS 102, as described above; other suitable systems for the execution of these methods may also be utilized. Additionally, implementation of the method is not limited to such examples.

At block 802, an API mashup corresponding to the first server and the second server is identified. The API mashup is identified from a plurality of API mashups, where each of the plurality of API mashups correspond to at least two servers from the plurality of servers. The API mashup may be identified by the data retrieving engine 304.

In an example, in addition to the server identifier for each of the plurality of servers, asset set identifier of an asset set being monitored by each of the plurality of servers, a plurality of users authorized to access the operational parameters of the asset set, and user credentials of the plurality of users authorized to access the operational parameters of the asset set, the server database may also include at least one API mashup corresponding to at least two servers from the plurality of servers. In the example, the API mashup may be identified by querying the server database.

At block 804, the API mashup may be utilized to transmit the first data retrieval request and the second data retrieval request. In an example, the first data retrieval request and the second data retrieval request may be transmitted by the data retrieving engine 304.

Processing multiple data retrieval requests, potentially by using the API mashups, enables retrieval of data from the plurality of sets simultaneously, thereby ensuring that the operational parameters received from the different asset sets are temporally aligned. As a result, challenges related to consistency and synchronization of operational parameters corresponding to the different asset sets are addressed.

In FIG. 9, at block 902, a first API corresponding to the first server is identified. The first API is identified from a plurality of APIs corresponding to the plurality of servers. The first API may be identified by the data retrieving engine 304.

In an example, in addition to the server identifier for each of the plurality of servers, asset set identifier of an asset set being monitored by each of the plurality of servers, a plurality of users authorized to access the operational parameters of the asset set, and user credentials of the plurality of users authorized to access the operational parameters of the asset set, the server database may also include an API corresponding to each of the plurality of servers. In the example, the first API may be identified by querying the server database.

At block 904, a second API corresponding to the second server is identified. The second API is identified from a plurality of APIs corresponding to the plurality of servers. Further, the second API may be identified by querying the server database. In an example, the second API may be identified by the data retrieving engine 304.

At block 906, the first API and the second API may be utilized to transmit the first data retrieval request and the second data retrieval request. In an example, the first data retrieval request and the second data retrieval request may be transmitted by the data retrieving engine 304.

Figure 10:
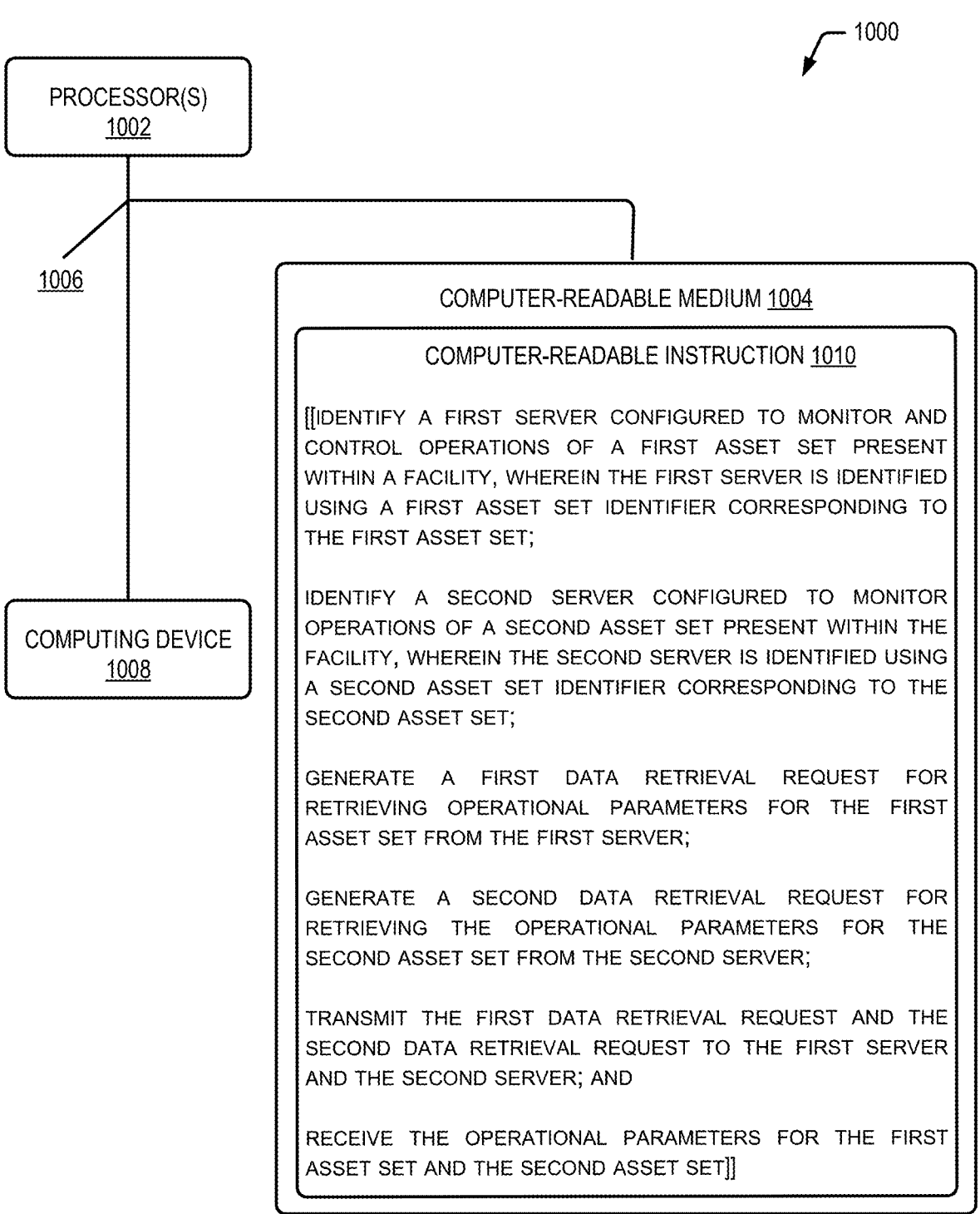
FIG. 10 illustrates a non-transitory computer-readable medium for optimizing retrieval of operational parameters for the plurality of asset sets, in accordance with an example of the present subject matter.

FIG. 10 illustrates a non-transitory computer-readable medium for optimizing retrieval of operational parameters for the plurality of asset sets, in accordance with an example of the present subject matter.

In an example, the computing environment 1000 includes processor 1002 communicatively coupled to a non-transitory computer readable medium 1004 through communication link 1006. In an example implementation, the computing environment 1000 may be for example, the ADPS 102. In an example, the processor 1002 may have one or more processing resources for fetching and executing computer-readable instructions from the non-transitory computer readable medium 1004. The processor 1002 and the non-transitory computer readable medium 1004 may be implemented, for example, in the ADPS 102.

The non-transitory computer readable medium 1004 may be, for example, an internal memory device or an external memory. In an example implementation, the communication link 1006 may be a network communication link, or other communication links, such as a PCI (Peripheral component interconnect) Express, USB-C (Universal Serial Bus Type-C) interfaces, I2C (Inter-Integrated Circuit) interfaces, etc. In an example implementation, the non-transitory computer readable medium 1004 includes a set of computer readable instructions 1010 which may be accessed by the processor 1002 through the communication link 1006 and subsequently executed for retrieving the operational parameters for the plurality of asset sets. The processor(s) 1002 and the non-transitory computer readable medium 1004 may also be communicatively coupled to a computing device 1008 over the network.

Referring to FIG. 10, in an example, the non-transitory computer readable medium 1004 includes computer readable instructions 1010 that cause the processor 1002 to identify the first server configured to monitor and control operations of the first asset set, where the first server may be identified using a first asset set identifier corresponding to the first asset set. Further, the first server may be identified from a plurality of servers configured to monitor and control the plurality of asset sets. In an example, the instructions 1010 may cause the processor 1002 to query the server database to identify the first server.

The instructions 1010 may then cause the processor 1002 to identify a second server configured to monitor operations of a second asset set present within the facility, where the second server is identified using a second asset set identifier corresponding to the second asset set. Further, the second server may be identified from the plurality of servers. In an example, the instructions 1010 may cause the processor 1002 to query the server database to identify the second server.

The instructions 1010 may cause the processor 1002 to identify the first server and the second server based on a probability of receiving the data retrieval request for the operational parameters of the first asset set and the second asset set. In the example, the probability may be derived based on a plurality of historical data retrieval requests received for simultaneously providing the operational parameters of at least two asset sets from the plurality of asset sets.

The instructions 1010 may then cause the processor 1002 to generate a first data retrieval request for retrieving operational parameters for the first asset set from the first server. In an example, to generate the first data retrieval request, the instructions 1010 may cause the processor 1002 to utilize the user credentials of a first user set authorized to access the operational parameters of the first asset set. In the example, the instructions 1010 may cause the processor 1002 to generate the first data retrieval request in a first format compliant with the first server.

Thereafter, the instructions 1010 may cause the processor 1002 to generate a second data retrieval request for retrieving operational parameters for the second asset set from the second server. In an example, to generate the second data retrieval request, the instructions 1010 may cause the processor 1002 to utilize the user credentials of a second user set authorized to access the operational parameters of the second asset set. In the example, the instructions 1010 may cause the processor 1002 to generate the second data retrieval request in a second format compliant with the second server.

The instructions 1010 may then cause the processor 1002 to transmit the first data retrieval request and the second data retrieval request to the first server and the second server. In an example, the instructions 1010 may cause the processor 1002 to transmit the first data retrieval request and the second data retrieval request using individual APIs corresponding to each of the first server and the second server. In another example, the instructions 1010 may cause the processor 1002 to transmit the first data retrieval request and the second data retrieval request using the API mashup corresponding to the first server and the second server.

Subsequently, the instructions 1010 may cause the processor 1002 to transmit the first data retrieval request and the second data retrieval request to the first server and the second server.

In an example, the instructions 1010 may then cause the processor 1002 to receive a data retrieval request for retrieving operational parameters for the first asset set and the second asset set. In an example the data retrieval request may be received from a requesting user and include user credentials of the requesting user. The instructions 1010 may then authenticate the requesting user using the user credentials of the requesting user. Subsequently, the instructions 1010 may cause the processor 1002 to return the operational parameters for the first asset set and the second asset set.

Although examples of the present subject matter have been described in language specific to methods and/or structural features, it is to be understood that the present subject matter is not limited to the specific methods or features described. Rather, the methods and specific features are disclosed and explained as examples of the present subject matter.

We claim:

1. A method comprising:

receiving a data retrieval request for retrieving operational parameters for a first asset set and a second asset set present within a facility, wherein the data retrieval request comprises a first asset set identifier corresponding to the first asset set and a second asset set identifier corresponding to the second asset set;

identifying a first server configured to monitor and control operations of the first asset set using the first asset set identifier, wherein the first server is identified from a plurality of servers configured to monitor and control a plurality of asset sets within the facility;

identifying a second server configured to monitor and control operations of the second asset set using the second asset set identifier, wherein the second server is identified from the plurality of servers;

generating a first data retrieval request for retrieving the operational parameters for the first asset set from the first server, wherein the first data retrieval request is generated in a first format compliant with the first server;

generating a second data retrieval request for retrieving the operational parameters for the second asset set from the second server, wherein the second data retrieval request is generated in a second format compliant with the second server;

transmitting the first data retrieval request and the second data retrieval request to the first server and the second server; and receiving the operational parameters for the first asset set and the second asset set; and returning the operational parameters for the first asset set and the second asset set.

2. The method as claimed in claim 1, wherein identifying the first server and the second server comprises querying a server database comprising a server identifier for each of the plurality of servers, asset set identifier of an asset set being monitored by each of the plurality of servers, a plurality of users authorized to access the operational parameters of the asset set, user credentials of the plurality of users authorized to access the operational parameters of the asset set, and at least one Application Programming Interface (API) mashup corresponding to at least two servers from the plurality of servers.

3. The method as claimed in claim 2, wherein transmitting the first data retrieval request and the second data retrieval request comprises:

identifying an API mashup corresponding to the first server and the second server, wherein the API mashup is identified from a plurality of API mashups, and each of the plurality of API mashups correspond to at least two servers from the plurality of servers;

utilizing the API mashup to transmit the first data retrieval request and the second data retrieval request.

4. The method as claimed in claim 1, wherein identifying the first server and the second server comprises querying a server database comprising a server identifier for each of the plurality of servers, asset set identifier of an asset set being monitored by each of the plurality of servers, a plurality of users authorized to access the operational parameters of the asset set, user credentials of the plurality of users authorized to access the operational parameters of the asset set, and at least one API corresponding to each of the plurality of servers.

5. The method as claimed in claim 4, wherein transmitting the first data retrieval request comprises:

identifying a first API corresponding to the first server, wherein the first API is identified from a plurality of APIs corresponding to the plurality of servers; and utilizing the first API to transmit the first data retrieval request.

6. The method as claimed in claim 5, wherein transmitting the second data retrieval request comprises:

identifying a second API corresponding to the second server, wherein the second API is identified from the plurality of APIs; and utilizing the second API to transmit the second data retrieval request.

7. The method as claimed in claim 2, wherein the data retrieval request is received from a requesting user and comprises user credentials of the requesting user, and wherein the method further comprises:

authenticating the requesting user using the user credentials of the requesting user.

8. The method as claimed in claim 7, wherein generating the first data retrieval request comprises:

identifying a first user set authorized to access the operational parameters for the first asset set;

identifying user credentials corresponding to the first user set; and generating the first data retrieval request using the user credentials corresponding to the first user set.

9. The method as claimed in claim 7, wherein generating the second data retrieval request comprises:

identifying a second user set authorized to access the operational parameters of the second asset set; identifying user credentials corresponding to the second user set; and generating the second data retrieval request using the user credentials corresponding to the second user set.

10. An Asset Data Provisioning System (ADPS), comprising:

an interaction engine to receive a data retrieval request for retrieving operational parameters for a first asset set and a second asset present within a facility, wherein the data retrieval request comprises a first asset set identifier corresponding to the first asset set and a second asset set identifier corresponding to the second asset set;

a data retrieving engine coupled to the interaction engine to:

identify a first server configured to monitor and control operations of the first asset set using the first asset set identifier, wherein the first server is identified from a plurality of servers configured to monitor and control a plurality of asset sets within the facility;

identify user credentials of a first user set authorized to access the operational parameters of the first asset set;

generate a first data retrieval request for retrieving the operational parameters for the first asset set from the first server, wherein the first data retrieval request is generated using the user credentials of the first user set, and the first data retrieval request is generated in a first format compliant with the first server;

identify a second server configured to monitor and control operations of the second asset set using the second asset set identifier, wherein the second server is identified from the plurality of servers;

identify user credentials of a second user set authorized to access the operational parameters of the second asset set;

generate a second data retrieval request for retrieving the operational parameters for the second asset set from the second server, wherein the second data retrieval request is generated using the user credentials of the second user set, and the second data retrieval request is generated a second format compliant with the second server;

transmit the first data retrieval request and the second data retrieval request to the first server and the second server; and receive the operational parameters for the first asset set and the second asset set; and a data provisioning engine coupled to the data retrieving engine to return the operational parameters for the first asset set and the second asset set.

11. The ADPS as claimed in claim 10, wherein to identify the first server and the second server, the data retrieving engine is to query a server database comprising a server identifier for each of the plurality of servers, asset set identifier of an asset set being monitored by each of the plurality of servers, a plurality of users authorized to access the operational parameters of the asset set, user credentials of the plurality of users authorized to access the operational parameters of the asset set, and at least one API corresponding to each of the plurality of servers.

12. The ADPS as claimed in claim 11, wherein to transmit the first data retrieval request and the second data retrieval request, the data retrieving engine is to:

identify a first API corresponding to the first server, wherein the first API is identified from a plurality of APIs corresponding to the plurality of servers;

identify a second API corresponding to the second server, wherein the second API is identified from the plurality of APIs;

utilize the first API and the second API to transmit the first data retrieval request and the second data retrieval request.

13. The ADPS as claimed in claim 10, wherein to identify the first server and the second server, the data retrieving engine is to query a server database comprising a server identifier for each of the plurality of servers, asset set identifier of an asset set being monitored by each of the plurality of servers, a plurality of users authorized to access the operational parameters of the asset set, user credentials of a plurality of users authorized to access the operational parameters of the asset set, and at least one API mashup corresponding to at least two servers from the plurality of servers.

14. The ADPS as claimed in claim 13, wherein to transmitting the first data retrieval request and the second data retrieval request, the data retrieving engine is to:

identify an API mashup corresponding to the first server and the second server, wherein the API mashup is identified from a plurality of API mashups, and each of the plurality of API mashups correspond to at least two servers from the plurality of servers; and utilize the API mashup to transmit the first data retrieval request and the second data retrieval request.

15. A non-transitory computer readable medium comprising computer-readable instructions that when executed cause a processing resource of a computing device to:

identify a first server configured to monitor and control operations of a first asset set present within a facility, wherein the first server is identified using a first asset set identifier corresponding to the first asset set, and the first server is identified from a plurality of servers configured to monitor and control a plurality of asset sets within the facility;

identify a second server configured to monitor and control operations of a second asset set present within the facility, wherein the second server is identified using a second asset set identifier corresponding to the second asset set, and the second server is identified from the plurality of servers;

generate a first data retrieval request for retrieving operational parameters for the first asset set from the first server, wherein the first data retrieval request is generated in a first format compliant with the first server;

generate a second data retrieval request for retrieving the operational parameters for the second asset set from the second server, wherein the second data retrieval request is generated in a second format compliant with the second server;

transmit the first data retrieval request and the second data retrieval request to the first server and the second server; and receive the operational parameters for the first asset set and the second asset set.

16. The non-transitory computer readable medium as claimed in claim 15, wherein the instructions further cause the processing resource to:

receive a data retrieval request for retrieving operational parameters for the first asset set and the second asset set, wherein the data retrieval request is received from a requesting user and comprises user credentials of the requesting user;

authenticate the requesting user using the user credentials of the requesting user; and returning the operational parameters for the first asset set and the second asset set.

17. The non-transitory computer readable medium as claimed in claim 15, wherein to identify the first server and the second server, the instructions cause the processing resource to query a server database comprising a server identifier for each of the plurality of servers, asset set identifier of an asset set being monitored by each of the plurality of servers, a plurality of users authorized to access the operational parameters of the asset set, user credentials of a plurality of users authorized to access the operational parameters of the asset set, and at least one API mashup corresponding to at least two servers from the plurality of servers.

18. The non-transitory computer readable medium as claimed in claim 16, wherein to transmit the first data retrieval request and the second data retrieval request, the instructions cause the processing resource to:

identify an API mashup corresponding to the first server and the second server, wherein the API mashup is identified from a plurality of API mashups, and each of the plurality of API mashups correspond to at least two servers from the plurality of servers;

utilize the API mashup to forward the first data retrieval request and the second data retrieval request.

19. The non-transitory computer readable medium as claimed in claim 15, wherein to identify the first server and the second server, the instructions cause the processing resource to query a server database comprising a server identifier for each of the plurality of servers, asset set identifier of an asset set being monitored by each of the plurality of servers, a plurality of users authorized to access the operational parameters of the asset set, user credentials of a plurality of users authorized to access the operational parameters of the asset set, and at least one API corresponding to each of the plurality of servers.

20. The non-transitory computer readable medium as claimed in claim 18, wherein to transmit the first data retrieval request and the second data retrieval request, the instructions cause the processing resource to:

identify a first API corresponding to the first server, wherein the first API is identified from a plurality of APIs corresponding to the plurality of servers;

identify a second API corresponding to the second server, wherein the second API is identified from the plurality of APIs; and utilize the first API and the second API to transmit the first data retrieval request and the second data retrieval request.

* * * * *